(12) United States Patent
Gonzalez et al.

(10) Patent No.: US 9,644,671 B2
(45) Date of Patent: May 9, 2017

(54) BEARING ASSEMBLIES INCLUDING A THERMALLY CONDUCTIVE STRUCTURE, BEARING APPARATUSES, AND METHODS OF USE

(71) Applicant: US SYNTHETIC CORPORATION, Orem, UT (US)

(72) Inventors: Jair Jahaziel Gonzalez, Provo, UT (US); S. Barrett Peterson, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 15/255,646

(22) Filed: Sep. 2, 2016

(65) Prior Publication Data

US 2016/0369840 A1  Dec. 22, 2016

Related U.S. Application Data

(63) Continuation of application No. 14/676,713, filed on Apr. 1, 2015, now Pat. No. 9,453,529, which is a (Continued)

(51) Int. Cl.
*F16C 17/00* (2006.01)
*F16C 33/02* (2006.01)
(Continued)

(52) U.S. Cl.
CPC ............ *F16C 17/243* (2013.01); *B23K 31/02* (2013.01); *B23P 15/003* (2013.01); *F16C 17/02* (2013.01);
(Continued)

(58) Field of Classification Search
CPC .... F16C 17/035; F16C 17/065; F16C 17/243; F16C 33/043; F16C 37/002;
(Continued)

(56) References Cited

U.S. PATENT DOCUMENTS 3,829,180 A   8/1974  Gardner
4,468,138 A   8/1984  Nagel
(Continued)

FOREIGN PATENT DOCUMENTS

WO   WO 2009/051938   4/2009

OTHER PUBLICATIONS

International Search Report and Written Opinion from International Application No. PCT/US2014/017489 mailed Jun. 27, 2014.
(Continued)

*Primary Examiner* — Phillip A Johnson
(74) *Attorney, Agent, or Firm* — Dorsey & Whitney LLP (57) ABSTRACT

Embodiments of the invention are directed to bearing assemblies configured to effectively provide heat distribution from and/or heat dissipation for bearing element, bearing apparatuses including such bearing assemblies, and methods of operating such bearing assemblies and apparatuses. In an embodiment, a bearing assembly includes a plurality of superhard bearing elements distributed about an axis. Each superhard bearing element of the plurality of superhard bearing elements has a superhard material including a superhard surface. Additionally, a support ring structure that includes a support ring that supports the plurality of superhard bearing elements and a thermally-conductive structure in thermal communication with the superhard table of each of the plurality of superhard bearing elements. The thermally-conductive structure has a higher thermal conductivity than the support ring of the support ring structure.

20 Claims, 6 Drawing Sheets

Related U.S. Application Data continuation of application No. 14/309,376, filed on Jun. 19, 2014, now Pat. No. 9,022,657, which is a continuation of application No. 13/801,125, filed on Mar. 13, 2013, now Pat. No. 8,807,837.

(51) Int. Cl.

| | | |
|---|---|---|
| *F16C 17/24* | (2006.01) | |
| *F16C 17/02* | (2006.01) | |
| *F16C 17/04* | (2006.01) | |
| *F16C 17/10* | (2006.01) | |
| *F16C 33/04* | (2006.01) | |
| *F16C 33/10* | (2006.01) | |
| *F16C 33/26* | (2006.01) | |
| *B23K 31/02* | (2006.01) | |
| *B23P 15/00* | (2006.01) | |
| *F16C 33/12* | (2006.01) | |
| *F16C 43/02* | (2006.01) | |
| *F16C 37/00* | (2006.01) | |

(52) U.S. Cl.
CPC .............. *F16C 17/04* (2013.01); *F16C 17/10* (2013.01); *F16C 33/043* (2013.01); *F16C 33/108* (2013.01); *F16C 33/127* (2013.01); *F16C 33/26* (2013.01); *F16C 37/00* (2013.01); *F16C 43/02* (2013.01); *F16C 2202/20* (2013.01); *F16C 2206/04* (2013.01); *F16C 2206/40* (2013.01); *F16C 2226/34* (2013.01); *F16C 2352/00* (2013.01); *Y10T 29/49643* (2015.01)

(58) Field of Classification Search
CPC .............. F16C 2202/20; F16C 2202/22; F16C 2202/2206; F16C 2202/04; F16C 2202/82; F16C 2226/34
See application file for complete search history.

(56) References Cited

U.S. PATENT DOCUMENTS

| | | |
|---|---|---|
| 4,525,083 A | 6/1985 | Pedersen |
| 4,560,014 A | 12/1985 | Geczy |
| 4,720,199 A | 1/1988 | Geczy et al. |
| 5,253,939 A | 10/1993 | Hall |
| 5,342,129 A | 8/1994 | Dennis et al. |
| 7,866,418 B2 | 1/2011 | Bertagnolli et al. |
| 7,998,573 B2 | 8/2011 | Qian et al. |
| 8,034,136 B2 | 10/2011 | Sani |
| 8,236,074 B1 | 8/2012 | Bertagnolli et al. |
| 8,277,124 B2 | 10/2012 | Sexton et al. |
| 8,496,075 B2 | 7/2013 | Scott et al. |
| 8,807,837 B1 | 8/2014 | Gonzalez et al. |
| 8,814,434 B1 | 8/2014 | Sexton et al. |
| 9,022,657 B2 | 5/2015 | Gonzalez et al. |
| 2007/0046120 A1* | 3/2007 | Cooley .................. E21B 4/003 310/90.5 |
| 2011/0174544 A1 | 7/2011 | Scott et al. |
| 2012/0057814 A1 | 3/2012 | Dadson et al. |
| 2014/0345141 A1 | 11/2014 | Gonzalez et al. |
| 2015/0204380 A1 | 7/2015 | Gonzalez et al. |

OTHER PUBLICATIONS

U.S. Appl. No. 13/801,125, Nov. 14, 2013, Office Action.
U.S. Appl. No. 13/801,125, Mar. 20, 2014, Notice of Allowance.
U.S. Appl. No. 13/801,125, Jul. 2, 2014, Issue Notification.
U.S. Appl. No. 13/801,125, Jul. 22, 2014, Supplemental Notice of Allowance.
U.S. Appl. No. 13/801,125, Jul. 30, 2014, Issue Notification.
U.S. Appl. No. 14/309,376, Sep. 24, 2014, Office Action.
U.S. Appl. No. 14/309,376, Jan. 20, 2015, Notice of Allowance.
U.S. Appl. No. 14/309,376, Apr. 15, 2015, Issue Notification.
U.S. Appl. No. 14/676,713, Mar. 4, 2016, Office Action.
U.S. Appl. No. 14/676,713, Jun. 2, 2016, Notice of Allowance.

\* cited by examiner

BEARING ASSEMBLIES INCLUDING A THERMALLY CONDUCTIVE STRUCTURE, BEARING APPARATUSES, AND METHODS OF USE

CROSS-REFERENCE TO RELATED APPLICATIONS

This application is a continuation of U.S. application Ser. No. 14/676,713 filed on 1 Apr. 2015, which is a continuation of U.S. application Ser. No. 14/309,376 filed on 19 Jun. 2014 (now U.S. Pat. No. 9,022,657 issued on 5 May 2015), which is a continuation of U.S. application Ser. No. 13/801,125 filed on 13 Mar. 2013 (now U.S. Pat. No. 8,807,837 issued on 19 Aug. 2014). The disclosure of each of the foregoing applications is incorporated herein, in their entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. Bearing apparatuses (e.g., thrust, radial, tapered, and other types of bearings) also may be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

A typical bearing apparatus includes a stator that does not rotate and a rotor that is attached to the output shaft and rotates with the output shaft. The stator and rotor each includes a plurality of bearing elements, which may be fabricated from polycrystalline diamond compacts ("PDCs") that provide diamond bearing surfaces that bear against each other during use.

The operational lifetime of the bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Embodiments of the invention are directed to bearing assemblies configured to effectively provide heat distribution from and/or heat dissipation for bearing elements, bearing apparatuses including such bearing assemblies, and methods of operating such bearing assemblies and apparatuses. In an embodiment, a bearing assembly includes a plurality of superhard bearing elements distributed about an axis. Each superhard bearing element of the plurality of superhard bearing elements includes a superhard material having a superhard bearing surface. The bearing assembly includes a support ring structure that includes a support ring that supports the plurality of superhard bearing elements and a thermally-conductive structure in thermal communication with the superhard material of each of the plurality of superhard bearing elements. The thermally-conductive structure has a higher thermal conductivity than the support ring of the support ring structure.

In an embodiment, a method of maintaining operating temperature of superhard bearing elements, which form part of a bearing assembly, below a selected temperature thereof is disclosed. The method includes supporting a plurality of superhard bearing elements by a support ring that has a relatively low thermal conductivity. The method also includes selectively loading a first set of one or more superhard bearing elements of the plurality of superhard bearing elements in a manner that the first set of one or more superhard bearing elements experiences a higher load than a second set of one or more superhard bearing elements of the plurality of superhard bearing elements. Furthermore, the method includes transferring heat the first set of one or more superhard bearing elements to a thermally-conductive structure that has a substantially higher thermal conductivity than the support ring.

In an embodiment, a bearing apparatus includes a first bearing assembly, which includes one or more first bearing surfaces, and a support ring carrying the one or more first bearing surfaces. The bearing apparatus also includes a second bearing assembly including a plurality of superhard bearing elements. Moreover, each of the plurality of superhard bearing elements has a second superhard bearing surface positioned and oriented to engage the one or more first bearing surfaces of the first bearing assembly. The second bearing assembly also has a support ring structure securing the plurality of superhard bearing elements. The support ring structure includes a support ring that supports the plurality of superhard bearing elements and a thermally-conductive structure thermally connecting the plurality of superhard bearing elements to each other.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments of the invention are directed to bearing assemblies configured to effectively provide heat distribution from and/or heat dissipation for bearing elements, bearing apparatuses including such bearing assemblies, and methods of operating such bearing assemblies and apparatuses. In particular, one or more embodiments include a bearing apparatus, which may include a first and second bearing assemblies (e.g., a stator and a rotor) configured to engage one another, and which may provide heat distribution and/or dissipation across bearing elements that may comprise the first and/or second bearing assemblies. In some operational conditions, one or more of the bearing elements may be preferentially loaded, such as to carry preferentially higher radial and/or axial loads (i.e., structural loads). Additionally, it is believed that some of the bearing elements of the bearing assembly may experience increased friction or frictional load relative to other bearing elements that comprise the same bearing assembly. It is also believed that, under certain conditions, one or a several bearing elements may experience relatively high-loads, while other bearing elements may experience relatively low-loads. For example, the one or more bearing elements in a thrust-bearing assembly may extend farther out of plane (e.g., by 0.001") relative to the other, bearing elements and, thus, may experience higher forces and/or friction. In one example, certain bearing elements may experience a higher thermal load or may heat up at an accelerated rate, as compared with other bearing elements, for reasons that are not currently fully understood.

Accelerated and/or uneven heating or thermal loading of the bearing elements may lead to premature failure of the bearing assembly. For instance, the bearing elements may include a superhard material, which may deteriorate and/or degrade, and experience failure at elevated temperatures that may result from such heating. In addition, thermal expansion of the one or more bearing elements may increase forces on the one or more bearing elements during operation. In some instances, increased structural loading of the bearing elements may lead to deformation and/or fracturing of the bearing assembly and/or component or elements thereof. In any case, accelerated and/or uneven heating of the bearing elements may prematurely cause damage thereto (e.g., by damaging or degrading the superhard material that may comprises such bearing elements), which may lead to the failure of the bearing assembly.

Accordingly, distributing heat among superhard bearing elements and/or dissipating heat therefrom may increase the useful life of the bearing assemblies and apparatuses, as provided in one or more embodiments disclosed herein. More specifically, a bearing assembly may incorporate a thermally-conductive structure, which may transfer heat between and/or among multiple superhard bearing elements that form part of the bearing assembly. In an embodiment, one or more thermally-conductive structures may provide a thermal connection between one or more superhard bearing elements. Hence, in at least one embodiment, thermally-conductive structures may at least partially redistribute the thermal load from one or more bearing elements (e.g., among a plurality or all of the bearing elements that comprise the bearing assembly).

Additionally, in an embodiment, redistributing the thermal load from one or several bearing elements among multiple bearing elements may help share or even substantially equalize thermal loads on the bearing elements of the bearing assembly. In other words, such redistribution may produce substantially the same or similar temperature across selected bearing elements (e.g., all or substantially all of the bearing elements). As such, the collective heat capacity of selected bearing elements may be utilized to absorb heat produced during the operation of the bearing assembly. These selected bearing elements may further dissipate the heat to the cooling fluid.

In some instances, the bearing assembly may receive and/or generate more heat in or near a first portion thereof (e.g., a portion closer to shaft), which may increase the temperature in the first portion of the bearing assembly, while the temperature in a second portion of the bearing assembly may remain at a lower temperature. Such uneven temperature distribution may warp the bearing assembly. Furthermore, in some situations, warping may inhibit or prevent hydrodynamic operation of the bearing apparatus and/or may unevenly load the superhard bearing elements. In an embodiment, the thermally-conductive structure can reduce or eliminate uneven heating of the bearing assembly, thereby reducing or eliminating warping thereof.

In one or more embodiments, the thermally conductive structures may generally provide temperature distribution across the bulk of the bearing assembly. That is, the thermally conductive structures may reduce or eliminate uneven temperature distribution within elements and/or components of the bearing assembly. Consequently, embodiments of the invention also may reduce thermal warping of the bearing assembly, which may increase the useful life thereof.

Accordingly, various embodiments disclosed herein involve bearing apparatuses and assemblies that may accommodate non-uniform structural, frictional, and/or thermal loading of bearing elements, such as superhard bearing elements. Additionally, in some embodiments, the bearing apparatuses and assemblies may be employed in and/or incorporated into apparatuses for use in downhole, subterranean drilling systems and other mechanical systems, as further described below.

Figure 1:
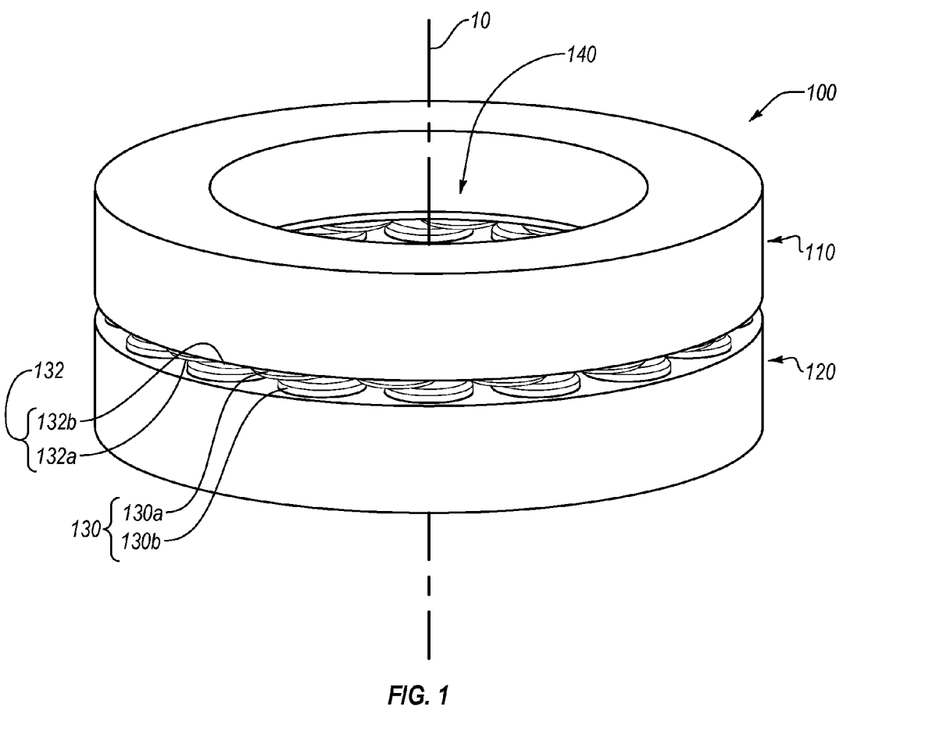
FIG. 1 is an isometric view of a thrust-bearing apparatus according to an embodiment.

FIG. 1 illustrates an embodiment of a thrust-bearing apparatus 100. Specifically, the thrust-bearing apparatus 100 may include first and second thrust-bearing assemblies 110, 120. The first thrust-bearing assembly 110 may be a stator that remains stationary, while the second thrust-bearing assembly 120 may be a rotor that may rotate relative to the stator, or vice versa.

Each of the first thrust-bearing assembly 110 and the second thrust-bearing assembly 120 may include multiple generally opposing superhard bearing elements 130 (e.g., superhard bearing elements 130a, 130b) that face and engage one another. As used herein, a "superhard bearing element" is a bearing element including a bearing surface that is made from a material exhibiting a hardness that is at least as hard as tungsten carbide. In any of the embodiments disclosed herein, the superhard bearing elements may include one or more superhard materials, such as polycrystalline diamond, polycrystalline cubic boron nitride, silicon carbide, tungsten carbide, or any combination of the foregoing superhard materials.

Additionally, the superhard bearing elements 130a, 130b may have bearing surfaces 132, such as the bearing surfaces 132a, 132b, respectively. In particular, the bearing surfaces 132a may generally oppose and engage the bearing surfaces 132b. As such, the superhard bearing elements 130 may prevent relative axial movement of the first thrust-bearing assembly 110 and the second thrust-bearing assembly 120 (along a thrust axis 10), while allowing the second thrust-bearing assembly 120 to rotate relative to the first thrust-bearing assembly 110 about the thrust axis 10.

Moreover, the first thrust-bearing assembly 110 and the second thrust-bearing assembly 120 may include openings, therein such as an opening 140 in the first thrust-bearing assembly 110. More specifically, a shaft, such as an output shaft of the subterranean drilling system, may fit through and/or may be secured within the openings 140. For example, the shaft may fit through the opening 140 of the first thrust-bearing assembly 110 in a manner that the shaft may freely rotate within the opening 140 of the first thrust-bearing assembly 110. Additionally, the first thrust-bearing assembly 110 may be secured within and/or to an element or component of a machine that remains stationary relative to the shaft (e.g., a housing of the subterranean drilling system).

The shaft may be secured within the opening (not shown) of the second thrust-bearing assembly 120. Hence, as the output shaft rotates, the first thrust-bearing assembly 110 may remain stationary and the second thrust-bearing assembly 120 may rotate together with the output shaft. Consequently, as described below in further detail, the thrust-bearing apparatus 100 may allow the shaft to rotate about the thrust axis 10. At the same time, the thrust-bearing apparatus 100 may prevent or limit linear axial movement of the shaft along the thrust axis 10 relative to the stationary elements or components that secure the first thrust-bearing assembly 110.

Although the thrust-bearing apparatus 100 described above may incorporate multiple superhard bearing elements 130 that have corresponding bearing surfaces 132, it should be appreciated that this is one of many embodiments. For example, the first thrust-bearing assembly 110 and/or the second thrust-bearing assembly 120 may include a single superhard bearing element that spans an entire circumference thereof. In other words, the superhard bearing element may form a single or substantially uninterrupted or continuous bearing surface that may span the entire circumference of the first and/or second thrust-bearing assemblies 110, 120. Furthermore, the first thrust-bearing assembly 110 and/or the second thrust-bearing assembly 120 may have any number of the superhard bearing elements 130 that may be spaced apart from each other in any desired configuration, which may vary from one embodiment to another. For instance, in some embodiments, the superhard bearing elements 130 may overlap, interlock, or otherwise fit together or abut one another thereby forming a substantially continuous 132.

In additional or alternative embodiments, the thrust-bearing apparatus may include only a single thrust-bearing bearing assembly (e.g., the first or second thrust-bearing assembly 110, 120). For example, the bearing surfaces 132 of the first thrust-bearing assembly 110 can engage a component or element of a machine, which may be stationary or may be moveable relative to the first thrust-bearing assembly 110. In an embodiment, the bearing surfaces 132 of the first thrust-bearing assembly 110 may engage a substantially flat plate that may be secured to a rotating element or component of a machine or mechanism that incorporates the first thrust-bearing assembly 110. Moreover, such plate may provide a bearing surface that, in some instances, may have a lower hardness than the superhard bearing elements 130 of the first bearing assembly 110. For instance, the bearing surface of a plate opposing the first thrust-bearing assembly 110 can have a hardness of about 30-32 HRc.

Except as described herein, the first thrust-bearing assembly 110 and its components and elements may be similar to or the same as the second thrust-bearing assembly 120 and its respective components and elements. Accordingly, for ease of description, references to the thrust-bearing assembly 110, unless noted otherwise, shall be understood to be equally applicable to the thrust-bearing assembly 120. For instance, as described above, the thrust-bearing assembly 110 may include a thermally-conductive structure that provides thermal communication between the superhard bearing elements 130. An embodiment of the thrust-bearing assembly 110 is illustrated in FIGS. 2A and 2B.

Figure 2A:
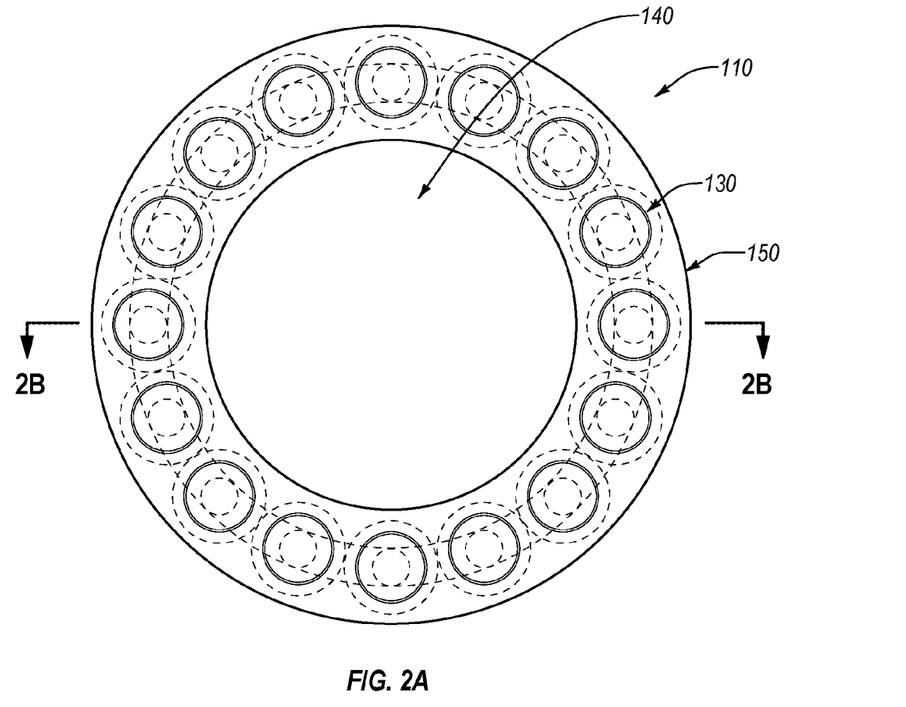
FIG. 2A is a top view of a thrust-bearing assembly according to an embodiment.

More specifically, as illustrated in FIG. 2A, the thrust-bearing assembly 110 includes a support ring structure 150 that carries the superhard bearing elements 130. As mentioned above, the support ring structure 150 may form or define the opening 140 therein. In some embodiments, the opening 140 may have a substantially circular or cylindrical shape. Alternatively, the opening 140 may have any number of suitable shapes, which may vary from one embodiment to another. In any case, the opening 140 may accommodate a shaft or other machine component or element that may pass therethrough and/or may be secured thereto. Furthermore, in an embodiment, the support ring structure 150 may have no openings 140.

Additionally, the support ring structure 150 may form or define an outer perimeter of the thrust-bearing assembly 110. Similar to the opening 140, the outer perimeter formed by the support ring structure 150 also may have any number of suitable shapes. In an embodiment, the outer perimeter has a substantially circular shape. In other embodiments, however, the outer perimeter may have a rectangular, triangular, trapezoidal, or essentially any other shape.

Figure 2B:
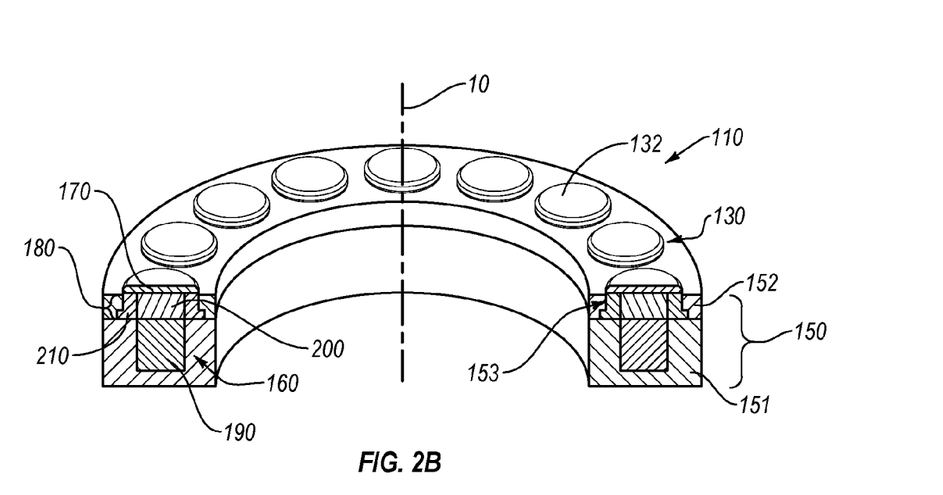
FIG. 2B is a cross-sectional view of the thrust-bearing assembly of FIG. 2A.

As illustrated in FIG. 2B, the support ring structure 150 may incorporate multiple elements or components. In one embodiment, the support ring structure 150 may include a support ring 151 and a retention ring 152. In some embodiments, the retention ring 152 may be coupled to the support ring 151. For example, the retention ring 152 and the support ring 151 may be bolted, welded, brazed, soldered, or otherwise secured together (e.g., via press-fit configuration with each other).

Furthermore, the retention ring 152 can couple or secure the superhard bearing elements 130 to the support ring structure 150. In additional or alternative embodiments, the support ring structure may be without the retention ring 152. Accordingly, in some embodiment, the superhard bearing elements 130 can be coupled directly to the support ring 151, as further described below.

In one or more embodiments, the superhard bearing elements 130 may have a shoulder that is retained by a corresponding portion of the retention ring 152 within corresponding recesses 153, in a manner that the superhard bearing elements 130 is held substantially fixed for stationary relative to the support ring structure 150. Additionally or alternatively, the superhard bearing elements 130 may be secured to the support ring structure 150 in any number of suitable ways that may vary from one embodiment to the next. For instance, the superhard bearing elements 130 may be secured within the recesses 153 partially therein via brazing, press-fitting, threadedly attaching, fastening with a fastener, combinations of the foregoing, or another suitable technique. As noted above, the supporting ring structure 150 may have no retention ring 152. Consequently, in some embodiments, the recesses 153 may be formed or defined within the support ring 151.

The support ring 151 and/or retention ring 152 may include a variety of different materials, compounds, and combinations of materials. For example, the support ring 151 and retention ring 152 may include a metal, alloy steel, a metal alloy, carbon steel, stainless steel, tungsten carbide, and combinations thereof. As further described below, various portions of the support ring structure 150 (e.g., the support ring 151 and/or retention ring 152) may include any number of other suitable or conductive, metallic, non-metallic, non-conductive, or semiconductive materials. Furthermore, the support ring 151 and/or the retention ring 152 may include a material that has a relatively low thermal conductivity, as compared to the thermal conductivity of thermally-conductive materials. In any event, the support ring 151 may include a suitable material, having sufficient strength and resilience to support the superhard bearing elements 130.

The superhard bearing elements 130 may have any number of suitable arrangements on the supporting ring structure 150, which may vary from one embodiment to another. For example, the superhard bearing elements 130 may be circumferentially positioned about the thrust axis 10 on the supporting ring structure 150. Moreover, the superhard bearing elements 130 may be arranged in a single row about the support ring structure 150. In additional or alternative embodiments, the superhard bearing elements 130 may be distributed in two rows, three rows, four rows, or any other number of rows.

In one or more embodiments, the superhard bearing elements 130 may be pre-machined to tolerances and mounted in the support ring structure 150. Also, the superhard bearing elements 130 may be first mounted in the support ring structure 150 and then planarized (e.g., by lapping and/or grinding) to form bearing surfaces 132 thereof, so that the bearing surfaces 132 are substantially coplanar. As mentioned above, in some instances, bearing surface 132 of one or more superhard bearing elements 130 may be out of plane relative to the bearing surfaces of other superhard bearing elements. Optionally, one or more of the superhard bearing elements 130 may have a peripherally extending edge chamfer.

In at least one embodiment, the support ring structure 150 may include a thermally-conductive structure 160, which may channel heat from one or more of the superhard bearing elements 130 to other superhard bearing elements 130. For instance, the thermally-conductive structure 160 may reduce an average thermal load of one or more superhard bearing elements 130 and/or may reduce an average thermal load of all of the superhard bearing elements 130 by channeling and/or redistributing heat therefrom among many superhard bearing elements 130, substantially all superhard bearing elements 130, or all of the superhard bearing elements 130. Accordingly, the thermally-conductive structure 160 may reduce the temperature of the superhard bearing elements 130 as well as prevent or limit rapid temperature increases thereof.

As mentioned above, high thermal load may result from high force and/or friction load experienced by certain superhard bearing elements 130. By reducing the average thermal load of the superhard bearing elements 130, the thermally-conductive structure 160 also may allow the superhard bearing elements 130 to wear in, such that the bearing surfaces 132 of the one or more superhard bearing elements 130 may be substantially coplanar with some or all of the superhard bearing elements 130. As such, the thermally-conductive structure 160 also may facilitate a wear-in period, while avoiding premature failure or degradation of the superhard bearing elements 130.

In some embodiments, the superhard bearing elements 130 may include a superhard table 170 bonded to a substrate 180. For example, the superhard table 170 may comprise polycrystalline diamond and the substrate 180 may comprise cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table 170 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 70 μm, 60 μm, 50 μm, 40 μm, 30 μm, 20 μm, 15 μm, 12 μm, 10 μm, 8 μm) and another portion exhibiting at least one relatively smaller size (e.g., 15 μm, 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In another embodiment, the diamond particles may include a portion exhibiting the relatively larger size between about 15 μm and about 50 μm and another portion exhibiting the relatively smaller size between about 5 μm and about 15 μm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements may be free-standing (e.g., substrateless) and formed from a polycrystalline diamond body that is at least partially or fully leached to remove a metal-solvent catalyst initially used to sinter the polycrystalline diamond body.

In some instances and for certain types of polycrystalline diamond, high thermal load on the superhard bearing elements 130 may produce temperatures that damage the superhard table 170, which may degrade or deteriorate the superhard table 170. For example, the superhard table 170 may comprise a polycrystalline diamond compact. Consequently, at temperatures of above around 700° C., the polycrystalline diamond may degrade under normal operating conditions, which may lead to the failure of the superhard bearing elements 130 and, thus, of the thrust-bearing assembly 110. Therefore, maintaining the operating temperature of the superhard bearing elements 130 below detrimental temperatures, by distributing the thermal load among all or many of the superhard bearing elements 130 through the thermally-conductive structure 160, may prolong the useful life of the thrust-bearing assembly 110.

In some embodiments, the thermally-conductive structure 160 may include a thermally-conductive element 190 and/or an optional post 200, which may include any number of suitable thermally-conductive materials. The optional post 200 may be coupled to or in contact with the thermally-conductive element 190. In any event, the optional post 200 may be in thermal communication with the thermally-conductive element 190. Examples of thermally-conductive materials for the thermally-conductive structure 190 and optional post include, but are not limited to, copper and copper alloys, aluminum and aluminum alloys, brass, bronze, gold, silver, graphite, diamond (e.g., polycrystalline diamond), and combinations thereof. For example, the thermally-conductive element 190 may be made from a material having a thermal conductivity that is about 5 to about 50 times (e.g., about 10 to about 25 times, about 15 to about 20 times, or about 18 to about 25 times) greater than that of the material from which the support ring 151 is made. For example, the material from which the thermally-conductive element 190 is made may exhibit a thermal conductivity at about 25° C. of about 200 W/m·K to about 2000 W/m·K, such as about 300 W/m·K to about 1800 W/m·K, about 350 W/m·K to about 450 W/m·K, or about 1500 W/m·K to about 1850 W/m·K. Moreover, various components and/or elements of the thrust-bearing assembly 110 can have varying yield strengths and fracture toughness, as described in more detail in U.S. application Ser. No. 13/281,681, the disclosure of which is incorporated herein, in its entirety, by this reference.

In at least one embodiment, the thermally-conductive element 190 may be substantially unitary. For example, the thermally-conductive element 190 may be a cylindrical ring, which may fit into a slot formed in the support ring 151. In other embodiments, the thermally-conductive element 190 may include multiple segments in thermal communication with each other as well as in thermal communication with the optional posts 200.

The support ring 151 may include a material that has higher strength (e.g., greater tensile strength, greater shear strength, greater hardness, etc.) than the thermally-conductive material that forms the thermally-conductive element 190. Similarly, in some instances, the thermally-conductive materials that form the thermally-conductive element 190 may have insufficient strength, rigidity, abrasion resistance, or a combination of such physical properties to facilitate operation in harsh environments. Accordingly, the support ring 151 may provide greater support to the superhard bearing elements 130, such that the thrust-bearing assembly 110 may withstand higher loads thereon. Hence, in some embodiments, the thermally-conductive structure 160, which may comprise one or more thermally-conductive materials, may be fully encased within the support ring structure 150 and/or superhard bearing elements 130. For example, the thermally-conductive element 190 may be encased between the support ring 151 and retention ring 152 of the support ring structure 150. As such, the support ring 151 and retention ring 152 may protect or shield the thermally-conductive element 190 from certain harsh environments.

As discussed above, the support ring 151 and/or retention ring 152 may provide sufficient structural support for the superhard bearing elements 130. As certain thermally-conductive materials may be substantially softer than the materials used in the support ring 151 and/or retention ring 152. Accordingly, the support ring 151 and/or the retention ring 152 may provide most of the structural support and rigidity for the thrust-bearing assembly 110. In an embodiment, the thermally-conductive element 190 may comprise copper, while the support ring 151 may comprise alloy steel. In the absence of the support ring 151, the copper thermally-conductive element 190 may provide insufficient support to the superhard bearing elements 130 under operational forces, which may lead to deformation of the thrust-bearing assembly 110. Moreover, in some embodiments, the support ring 151 is sized and configured in a manner that at least a portion of the support ring 151 is positioned under a bottom of the superhard bearing elements 130 (e.g., under the substrate 180 of the superhard bearing elements 130), such as to provide sufficient support therefor.

Also, a portion of the substrate 180 may be thermally-conductive and/or in thermal communication with the thermally-conductive element 190. In one embodiment, the substrate 180 may at least partially enclose and protect the optional post 200 from certain harsh environments. Hence, in at least one example, the substrate 180 comprises a tungsten carbide section 210 and the optional post 200. The tungsten carbide section 210 may shield the optional post 200 from the environment. Moreover, the tungsten carbide section 210 may provide sufficient support to the superhard table 170. In some embodiments, the tungsten carbide section 210 may be sized and configured such as to be positioned over and/or in contact with the support ring 151. Accordingly, the forces/pressure applied at the bearing surface 132 may be transferred through the superhard table 170, to the tungsten carbide section 210, and to the support ring 151.

In one or more embodiments, the substrate 180 may comprise the tungsten carbide section 210 and the optional post 200 prior to forming or bonding the superhard table 170 to the substrate 180. For example, the substrate 180 may initially comprise a single material, such as cobalt-cemented tungsten carbide. After the superhard table 170 is formed or otherwise bonded onto the substrate, a portion of the substrate may be removed, and the optional post 200 may replace such removed portion of the substrate. For example, a blind hole may be created in the substrate and the optional post 200 may be inserted and press-fitted, brazed, or otherwise secured within the hole, thereby forming the substrate 180, which may comprise the optional post 200 and the tungsten carbide section 210. In an embodiment, the optional post 200 may be in physical contact with the superhard table 170.

As described above, the thermally-conductive structure 160 may transfer the heat from one or several superhard bearing elements 130 across all of the superhard bearing elements 130 of the thrust-bearing assembly 110. Specifically, heat (which may be generated due to contact between the bearing surfaces 132 and the opposing bearing surface(s)) may be transferred from the superhard table 170 to the optional post 200, and to the thermally-conductive element 190. Subsequently, the heat may be distributed across all of the superhard bearing elements 130, as the thermally-conductive element 190 transfers heat to the optional posts 200 of the corresponding superhard bearing elements 130. In other words, all or most of the superhard bearing elements 130 of the thrust-bearing assembly 110 may include optional posts 200, which can transfer heat to and/or from the superhard table 170.

In some embodiments, the superhard tables 170 may also be thermally-conductive. For instance, as mentioned above, the superhard tables 170 may comprise polycrystalline diamond. Accordingly, the superhard tables 170 of superhard bearing elements 130 may also aid in dissipating heat from the thermally-conductive structure 160 and from the thrust-bearing assembly 110. In one example, the bearing surfaces 132 of the low-load superhard bearing elements 130 may be exposed to fluid, such as drilling fluid. Accordingly, the heat may be transferred from the thermally-conductive element 190 to the optional post 200 and to the superhard tables 170 of the superhard bearing elements 130. Thereafter, the heat may be transferred from the superhard tables 170 of the superhard bearing elements 130 to the fluid, thus dissipating the heat from the superhard bearing elements 130 and from the first thrust-bearing assembly 110.

In addition, the heat may be dissipated from the superhard tables 170 of all of the superhard bearing elements 130, as the drilling fluid contacts side portions of the superhard tables 170. Thus, distributing the thermal load across all of the superhard bearing elements 130 may increase overall heat dissipation from the superhard tables 170 by the drilling fluid. Consequently, the thermally-conductive structure 160 and thermally-conductive superhard tables 170 may reduce overall thermal load on the thrust-bearing assembly 110 as well as on the superhard bearing elements 130 thereof. As such, useful life and/or operating conditions (e.g., load bearing) of the thrust-bearing assembly 110 may be increased.

As described above, the thermally-conductive structure 160 may comprise the thermally-conductive element 190 and the optional post 200 and may be configured in a manner that distributes the thermal load from one or more of the superhard bearing elements 130 to all or most of the superhard bearing elements 130 of the first thrust-bearing assembly 110. It should be appreciated, however, that thermally-conductive structure 160 may have any number of suitable configurations that may transfer heat from one or more of the superhard bearing elements 130 to other superhard bearing elements 130, which may vary from one embodiment to another. For instance, another embodiment of a thermally-conductive structure is illustrated in FIG. 3A.

Figure 3A:
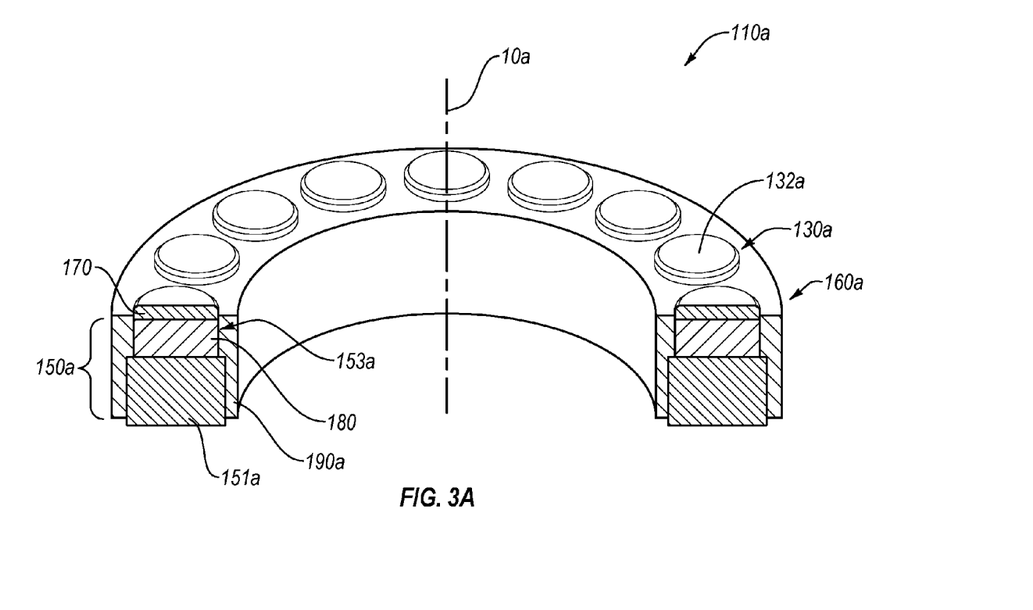
FIG. 3A is a cross-sectional view of a thrust-bearing assembly according to another embodiment.

In particular, FIG. 3A illustrates a thrust-bearing assembly 110a that incorporates a thermally-conductive structure 160a, which may include a thermally-conductive element 190a. Except as otherwise described herein, the thrust-bearing assembly 110a and its components and elements may be similar to or the same as thrust-bearing assembly 110 (FIGS. 2A and 2B) and its respective components and elements. The thrust-bearing assembly 110a includes a plurality of superhard bearing elements 130a positioned about a thrust axis 10a.

The thrust-bearing assembly 110a also may include a support ring structure 150a, which may support and carry the superhard bearing elements 130a. More specifically, the support ring structure 150a may have a plurality of recesses 153a within which the superhard bearing elements 130a may be secured. As noted above, among other ways of securing the superhard bearing elements 130a to the support ring structure 150a, embodiments disclosed herein may include the superhard bearing elements 130a being press-fitted into the recesses 153a or brazed to the thermally-conductive element 190a. However, in other embodiments, the recesses 153a of the thermally-conductive element 190a may be countersunk through holes similar to that shown in FIG. 2B and the superhard bearing elements 130a may include a shoulder or other geometric feature that helps retain the superhard bearing elements 130 in cooperation with the thermally-conductive element 190a.

Additionally, the support ring structure 150a may include a support ring 151a that supports the superhard bearing elements 130a. Furthermore, the support ring 151a may be at least partially surrounded by or encased in a thermally-conductive element 190a. Some instances, the thermally-conductive element 190a may be a substantially uniform or unitary piece, which at least partially encases or encapsulates the support ring 151a. In other words, in some embodiments, the thermally-conductive element 190a may define the outer perimeter of the thrust-bearing assembly 110a. In additional or alternative embodiments, the thermally-conductive element 190a may define the opening of the thrust-bearing assembly 110a.

As noted above, the support ring 151a may comprise a material that has a higher strength than the thermally-conductive material comprising the thermally-conductive element 190a. Accordingly, the support ring 151a may provide greater support to the superhard bearing elements 130a, such that the first thrust-bearing assembly 110a may withstand higher loads thereon. Thus, in at least one embodiment, a bottom surface of the support ring 151a may be coplanar with or protrude past a bottom surface of the thermally-conductive element 190a. As such, the bottom surface of the support ring 151a may be coupled or secured to a support surface such that the support ring 151a, such as to carry at least some of the load experienced by the superhard bearing elements 130a.

In some embodiments, the support ring 151a may be press-fitted into an opening or a channel in the thermally-conductive element 190a. Additionally or alternatively, the support ring 151a may be brazed, welded, fastened, or otherwise secured to the thermally-conductive element 190a. In any event, the support ring 151a and the thermally-conductive element 190a may be coupled together.

Similar to the superhard bearing elements 130 (FIGS. 2A and 2B), the superhard bearing elements 130a may comprise a superhard table 170 secured to a substrate 180. In some embodiments, the substrate 180 may be substantially uniform or unitary. For example, the substrate 180 may comprise a unitary piece of cemented tungsten carbide. In another embodiment, the substrate 180 may comprise of one or more sections, which may vary from one embodiment to another. In some embodiments, the substrate 180a may incorporate one or more thermally-conductive portions, which may be in contact or otherwise in thermal communication with the thermally-conductive element 190a. In any event, the substrate 180 may be supported by the support ring 151a, such that the forces applied to bearing surfaces 132a of the superhard bearing elements 130a may be carried by the substrates 180 and by the support ring 151a.

As described above, the thermally-conductive structure 160a may comprise the thermally-conductive element 190a. More specifically, the thermally-conductive element 190a may provide thermal communication among and between the superhard bearing elements 130a of the thrust-bearing assembly 110a. Accordingly, the thermally-conductive structure 160a may distribute the thermal load from one or more of the superhard bearing elements 130a among all or substantially all of the superhard bearing elements 130a of the thrust-bearing assembly 110a.

In some embodiments, at least a portion of the superhard table 170 may be in thermal communication with the thermally-conductive element 190a. Thus, heat from one or more superhard bearing elements 130a may be transferred from the superhard table 170 to the thermally-conductive element 190a, and to other superhard bearing elements 130a, thereby distributing the thermal load among a greater number of superhard bearing elements 130a. In one embodiment, a portion of the superhard table 170 may extend below a top surface of the thermally-conductive element 190a, such that that portion of the superhard table 170 is in contact with the thermally-conductive element 190a.

Moreover, as mentioned above, heat transferred from one or more of the superhard bearing elements 130a among a greater number of the superhard bearing elements 130a (e.g., all or substantially all of the superhard bearing elements 130a) may improve cooling of the superhard bearing elements 130a and of the thrust-bearing assembly 110a. For example, as fluid (e.g., drilling fluid) passes about the superhard bearing elements 130a, the fluid can remove heat therefrom.

Moreover, as the fluid flows about the thermally-conductive element 190a, the fluid may remove heat from such thermally-conductive element 190a as well as from the superhard bearing elements 130a, thereby cooling the superhard bearing elements 130a as well as the thrust-bearing assembly 110a. In any case, the thermally-conductive structure 160a may distribute heat from one or more superhard bearing elements 130a among additional superhard bearing elements 130a of the thrust-bearing assembly 110a. Consequently, the thermally-conductive structure 160a may increase useful life or performance of the thrust-bearing assembly 110a (e.g., by avoiding damage to the superhard table 170).

Figure 3B:
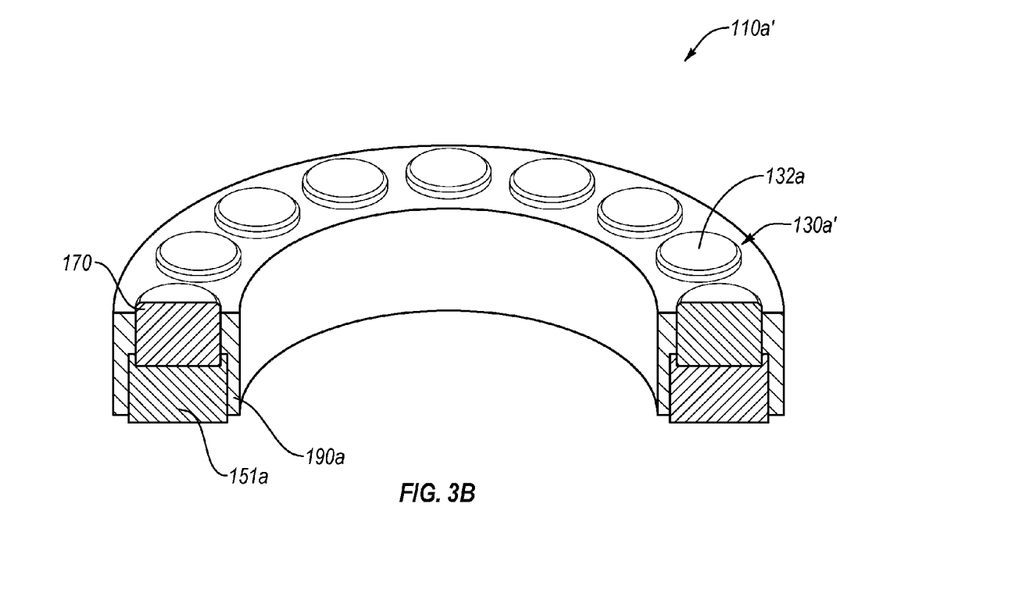
FIG. 3B is a cross-sectional view of a thrust-bearing assembly according to yet another embodiment.

The thickness of the superhard table 170 may vary according to various embodiments. Moreover, in some embodiments, the support ring 151a' also may be a substrate for the superhard table 170. For example, FIG. 3B illustrates a thrust-bearing assembly 110a' that includes a support ring 151a' and superhard bearing elements 130a', which include the superhard table 170 coupled to and/or supported by the support ring 151a'. The superhard table 170, which may be optionally fully leached, may reside directly on the support ring 151a'. In other words, the entire superhard bearing element 130a' may comprise the superhard table 170 or superhard body. Furthermore, in any of the embodiments disclosed herein, a PDC may be replaced with a PCD slug, which may be optionally partially or substantially fully leached.

In some embodiments, the superhard table 170 may be secured to the support ring 151a'. For example, the superhard table 170 may be brazed or otherwise secured to the support ring 151a'. Also, in some embodiments, the support ring 151a' can include recesses that can receive and/or restrain the superhard table 170 therein. Such recesses may at least partially restrain the superhard table 170 from moving relative to the support ring 151a'.

It should be appreciated that the superhard table 170 may have any suitable thickness. Moreover, in an embodiment, the outside surface of the superhard table 170 may be in physical and/or thermal contact or communication with the thermally-conductive element 190a. As noted above, the superhard table 170 may include thermally-conductive material (e.g., polycrystalline diamond). Accordingly, increasing the amount of surface of the superhard table 170 that is in thermal communication with the thermally-conductive element 190 can increase the rate of heat transfer therebetween (e.g., through convection) and between the superhard bearing elements 130a' and the thermally conductive element 190.

When the entire superhard bearing element 130a' comprises the superhard table 170, the superhard bearing element 130a' may have the greatest amount of surface of the superhard table 170 in thermal communication with the thermally-conductive element 190. Such configuration may maximize heat transfer between the superhard table 170 and the thermally-conductive element 190. The amount of surface of the superhard table 170 in thermal communication with the thermally-conductive element 190 may increase or decrease with corresponding increase or decrease in the thickness of the superhard table 170.

Furthermore, in an embodiment, the superhard bearing element 130a' may include a substrate (not shown) that supports the superhard table 170. Such substrate may be at least partially covered by the superhard table 170. In other words, the superhard table 170 may surround the substrate in a manner that at least a portion of the outside surface of the superhard bearing element 130a' is formed by the superhard table 170. Consequently, the superhard table 170 may be thinner closer to the center of the superhard bearing element 130a' and may be thicker closer to the outer edge(s) of the superhard bearing element 130a', in a manner that increases or maximizes the amount of the surface of the superhard table 170 that is in thermal communication with the thermally-conductive element 190.

Figure 4:
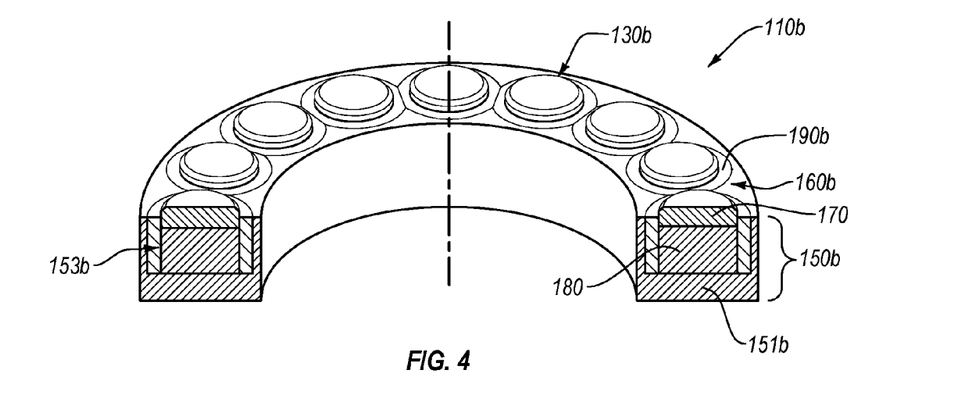
FIG. 4 is a cross-sectional view of the thrust-bearing assembly according to yet another embodiment.

Although thermally-conductive element, structure, or structures contemplated herein may comprise a single or unitary piece, it should be appreciated that in other embodiments the thermally-conductive element, structure, or structures may exhibit other configurations. For example, as illustrated in FIG. 4, a thrust-bearing assembly 110b may incorporate a thermally-conductive structure 160b that comprises a plurality of thermally-conductive elements 190b. Except as otherwise described herein, the thrust-bearing assembly 110b and its materials, components, or elements (e.g., bearing elements) may be similar to or the same as any of the thrust-bearing assemblies 110, 110a (FIGS. 2A-3A) respective components, materials, or elements.

In some embodiments, each of the plurality of the thermally-conductive elements 190b may surround each of a plurality of superhard bearing elements 130b. Furthermore, the thermally-conductive elements 190b may be in thermal communication with each other. Accordingly, the thermally-conductive elements 190b may transfer heat from one superhard bearing element 130b to another, adjacent superhard bearing element 130. Thus, the thermally-conductive elements 190b may distribute the heat from one or more superhard bearing elements 130b to a greater number of the superhard bearing elements 130b, such as among all or substantially all of the superhard bearing elements 130b. In an embodiment, any one of the thermally-conductive elements 190b. In an additional or alternative embodiment, some, most, or all of the thermally-conductive elements 190 may be coupled or connected to one or more of the adjacent thermally-conductive elements 190. For instance, adjacent thermally-conductive elements 190 may be brazed, welded, or otherwise secured or coupled together.

In one or more embodiments, the thrust-bearing assembly 110a may include a support ring structure 150b, which may secure and/or support the superhard bearing elements 130b therein. In particular, the support ring structure 150b may comprise a support ring 151b, which includes a plurality of recesses 153b therein. As noted above, the superhard bearing elements 130b may be press-fitted, brazed, fastened, or otherwise secured in the recesses 153b. Moreover, the superhard bearing elements 130b may be press fitted, brazed, or otherwise secured within the recesses 153b together with the thermally-conductive elements 190b. Accordingly, the thermally-conductive elements 190b may be at least partially insulated and/or protected from external or operating environment by the support ring 151b.

In some embodiments, the superhard bearing elements 130*b* may comprise a superhard table 170 bonded to the substrate 180. In one example, the substrate 180 may be a solid or unitary block of material, such as tungsten carbide or other suitable material. Moreover, the superhard table 170 may be in thermal communication and/or otherwise in contact with the thermally-conductive element 190*b*, such that the heat may be transferred from superhard table 170*b* to the thermally-conductive element 190*b*.

In other embodiments, the substrate 180 may comprise multiple materials, which may include one or more thermally-conductive materials. Furthermore, the thermally-conductive materials of the substrate 180 may be in contact or in thermal communication with the thermally-conductive elements 190*b*. In any event, however, the superhard bearing elements 130*b* may be in thermal communication with the thermally-conductive elements 190*b* and a manner that allows the heat to be transferred from one or more of the superhard bearing elements 130*b* to all or substantially all of the superhard bearing elements 130*b* of the thrust-bearing assembly 110*b*.

Figure 5:
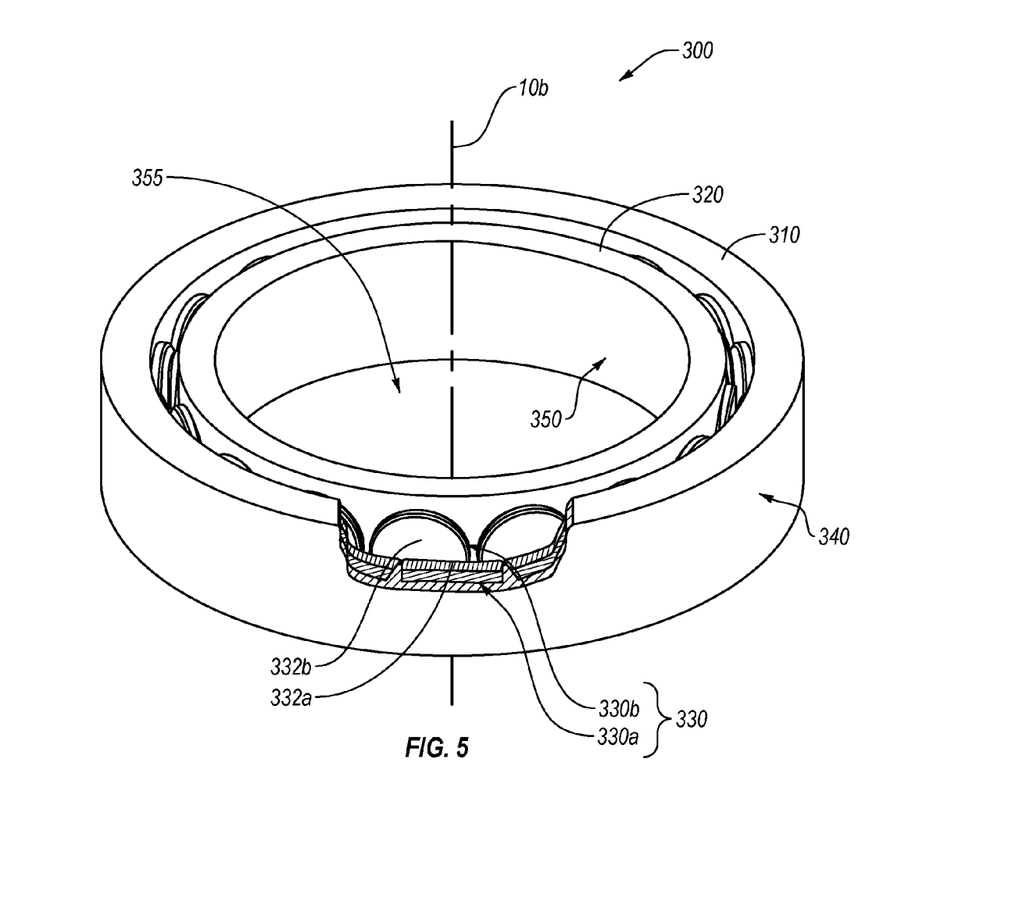
FIG. 5 is an isometric view of a radial-bearing apparatus according to an embodiment.

Although the above embodiments were described in connection with the thrust-bearing apparatuses and assemblies, it should be appreciated that other embodiments are directed radial-bearing apparatuses and assemblies. FIG. 5 illustrates an embodiment of a radial-bearing apparatus 300. The concepts used in the thrust-bearing assemblies and apparatuses described above also may be employed in radial-bearing assemblies and apparatuses. Furthermore, except as otherwise described herein, materials, components, or elements of the radial-bearing apparatus 300 may be similar to or the same as materials, components, or elements of various embodiments of the thrust-bearing apparatus or assemblies 100, 110, 110*a*, 110*b*, described above.

For instance, the radial-bearing apparatus 300 may comprise a first radial-bearing assembly 310 (i.e., an outer race) and a second radial-bearing assembly 320 (i.e., an inner race). The first radial-bearing assembly 310 and the second radial-bearing assembly 320 may be configured to allow relative rotation thereof about a rotation axis 10*b*. More specifically, in some instances, the first radial-bearing assembly 310 may be a stator (i.e., may remain coupled or fixed to a stationary element or component of a machine or mechanism) and the second radial-bearing assembly 320 may be a rotor, coupled to a rotating element or component of a machine or mechanism.

For example, the first radial-bearing assembly 310 may be fixed or coupled to the housing of the subterranean drilling system and the second radial-bearing assembly 320 may be fixed or coupled to the output shaft of the subterranean drilling system, as further described below. Alternatively, the second radial-bearing assembly 320 may be a stator, while the first radial-bearing assembly 310 may be a rotor that may rotate relative to the stator or about the second radial-bearing assembly 320. In any event, the first radial-bearing assembly 310 and second radial-bearing assembly 320 may facilitate rotation of elements or components of a machine about the rotation axis 10*b*, while preventing or limiting lateral movement of such elements or components relative to each other as well as relative to the rotation axis 10*b*.

In some embodiments, the first radial-bearing assembly 310 and the second radial-bearing assembly 320 may include bearing elements, such as superhard bearing elements 330 (e.g., superhard bearing elements 330*a*, 330*b*). In particular, the superhard bearing elements 330 may be secured to respective support ring structures 340, 350. The superhard bearing elements 330 also may be positioned about the rotation axis 10*b*. For example, the superhard bearing elements 330 may be positioned circumferentially about the rotation axis 10*b*. Moreover, in an embodiment, the support ring structure 350 may define an opening or a hole 355, which may accept the shaft (e.g., the output shaft of the subterranean drilling system) or a spindle. Additionally, such shaft may be secured to the support ring structure 350 in a manner that allows the shaft to rotate about rotation axis 10*b* together with the second radial-bearing assembly 320.

Similarly, the support ring structure 340 may define and outer perimeter (e.g., an outer diameter) of the first radial-bearing assembly 310. Furthermore, the support ring structure 340 may include support surfaces or areas that may couple or may be secured to a stationary portion of a device or mechanism. For instance, the support ring structure 340 of the first radial-bearing assembly 310 may be fixedly secured to a housing of the subterranean drilling system. Accordingly, the radial-bearing apparatus 300 may facilitate rotation of the output shaft relative to the housing about the rotation axis 10*b*.

The superhard bearing elements 330 may be arranged in corresponding single rows about the support ring structures 340, 350. In additional or alternative embodiments, the superhard bearing elements 330 may be distributed in two rows, three rows, four rows, or any other number of rows. Furthermore, the superhard bearing elements 330*a*, 330*b* may be arranged in a manner that allows the superhard bearing elements 330*a* and the superhard bearing elements 330*b* to engage each other as the first radial-bearing assembly 310 and second radial-bearing assembly 320 rotate relative to one another. In other words, the superhard bearing elements 330*a*, 330*b* may prevent or limit lateral movement of the first radial-bearing assembly 310 and second radial-bearing assembly 320 relative to each other, while allowing relative rotation thereof (e.g., about the rotation axis 10*b*).

Accordingly, at least one, some of, or each superhard bearing element 330*a* may include a superhard table (further described below) that has a concave bearing surface 332*a* (e.g., curved to form an interior surface of an imaginary tubular cylinder). Similarly, at least one, some of, or each superhard bearing element 330*b* may include a superhard table that has a convex bearing surface 332*b* (e.g., curved to form at least a portion of an exterior surface of an imaginary cylinder or sphere). In any event, the concave bearing surface 332*a* and the convex bearing surface 332*b* may be shaped, sized, positioned, and oriented to generally correspond with and engage one another during operation of the radial-bearing apparatus 300.

The radial-bearing apparatuses may have one or more superhard bearing elements 330 that experience higher forces and/or friction than the other superhard bearing elements 330. For example, it is possible that one or more superhard bearing elements 330 may extend or protrude relative to the imaginary cylindrical/spherical plane formed by the plurality of the superhard bearing elements 330 more than the other superhard bearing elements 330. Also in some instances, the rotation axis 10*b* may be oriented at a non-parallel angle relative to the vector of the gravitational pull of the Earth. Accordingly, weight of the machine elements or unbalanced weight distribution of components coupled to or supported by the first radial-bearing assembly 310 and/or by the second radial-bearing assembly 320 may apply uneven forces to certain superhard bearing elements 330 as compared with other superhard bearing elements 330. For instance, the shaft connected to the second radial-bearing assembly 320 and the housing securing the first radial-bearing assembly 310 may be oriented approximately horizontally or perpendicularly to the direction of Earth's gravitational pull. As such, the superhard bearing elements 330 positioned along a lower portion of the radial-bearing apparatus 300 (i.e., below a horizontal centerline of the radial-bearing apparatus 300) may experience higher forces and/or friction than the superhard bearing elements 330 positioned along an upper portion of the radial-bearing apparatus 300.

Consequently, as mentioned above, one or more superhard bearing elements 330 also may experience higher thermal loads thereon than other superhard bearing elements 330. Thus, in at least one embodiment, the first radial-bearing assembly 310 and/or second radial-bearing assembly 320 may incorporate a thermally-conductive structure. The thermally-conductive structure may distribute the thermal load from one or more superhard bearing elements 330 among additional (e.g., all or substantially all) superhard bearing elements 330. Hence, for example, the superhard bearing elements 330 may limit operational temperatures, which may limit or prevent damage or degradation of the superhard bearing elements 330.

Figure 6A:
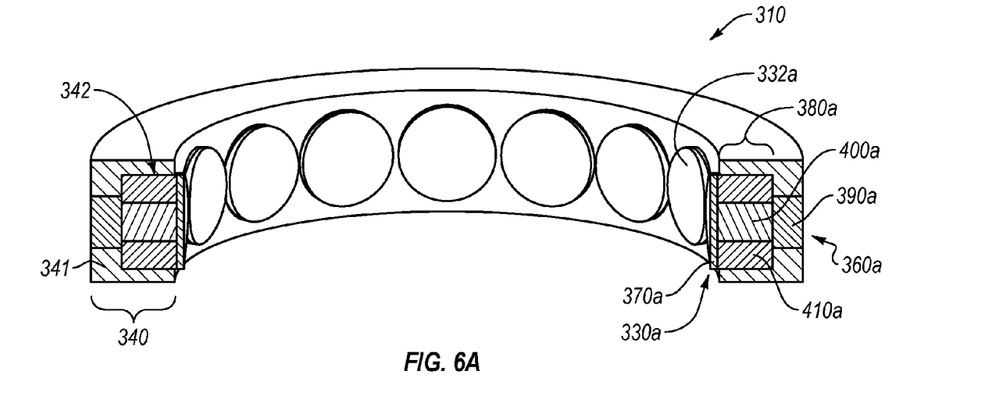
FIG. 6A is an isometric cutaway view of a radial-bearing assembly shown in FIG. 5 according to an embodiment.

For instance, FIG. 6A illustrates an embodiment of the first radial-bearing assembly 310 that incorporates a thermally-conductive structure 360a. As noted above, the thermally-conductive structure 360a may distribute the thermal load from a single or a few superhard bearing elements 330a among multiple superhard bearing elements 330a of the first radial-bearing assembly 310. Accordingly, the thermally-conductive structure 360a may be in thermal communication with all or substantially all of the superhard bearing elements 330a of the first radial-bearing assembly 310.

In some embodiments, the superhard bearing elements 330a may include a superhard table 370a and a substrate 380a. The superhard table 370a may be similar to or the same as superhard table 170 and substrate 380a may be similar to or the same as substrate 180 (FIG. 2B), as described above. Optionally, the substrate 380a may include an optional post 400a. For example, the substrate 380a may include a tungsten carbide section 410a and the optional post 400a. The optional post 400a may be press-fitted, brazed or otherwise secured to and/or in the tungsten carbide section 410a, as described above.

Moreover, the optional post 400a may be in thermal communication with the superhard table 370a. Accordingly, heat may be transferred from the superhard table 370a to the optional post 400a and vice versa. The optional post 400a also may be in thermal communication with the thermally-conductive element 390a. Particularly, the thermally-conductive element 390a together with the optional post 400a may form the thermally-conductive structure 360a that may conduct or transfer the heat away from a single or few superhard bearing elements 330a and distribute it among additional the superhard bearing elements 330a.

In addition, the support ring structure 340 of the first radial-bearing assembly 310 includes a support ring 341. The support ring 341 may provide sufficient support to the superhard bearing elements 330a. Moreover, the support ring 341 may include recesses 342, which may hold the superhard bearing elements 330a. For example, the superhard bearing elements 330a may be press-fitted, brazed, or otherwise secured in the corresponding recesses 342. Additionally or alternatively, the superhard bearing elements 330a may be brazed, welded, screwed, or otherwise secured to the support ring 341 in any number of suitable configurations.

Furthermore, in some embodiments, at least a portion of the substrate 380a may abut a bottom of the recess 342. For instance, the tungsten carbide section 410a may abut the support ring 341, such that the support ring 341 may provide sufficient support to the superhard bearing elements 330a. In other words, the structural load may be carried by and transferred from the concave bearing surface 332a to the superhard table 370a, to the tungsten carbide section 410a, and to the support ring 341.

The support ring 341 may comprise a material that has sufficient strength to support to the superhard bearing elements 330a. The support ring 341 may comprise alloy steel, other suitable materials, and/or any materials described above with respect to support ring 151 (FIG. 2B). Moreover, the material comprising support ring 341 may be substantially less thermally conductive than the materials comprising the thermally-conductive element 390a.

In an embodiment, the thermally-conductive element 390a may be substantially unitary (e.g., ring-like) and may be coupled or otherwise secured to or within the support ring 341. For example, the thermally-conductive element 390a may be positioned at least partially within a recess or a partial opening (e.g., a blind hole) within the support ring 341. In one embodiment, the thermally-conductive element 390a may be compressed from a first diameter, which may be greater than the outer perimeter of the support ring 341, to a second diameter, such that the thermally-conductive element 390a is secured (e.g., press-fit) within the support ring 341.

In additional or alternative embodiments, the thermally-conductive element 390a may comprise multiple segments in thermal communication with each other as well as in thermal communication with the superhard bearing elements 330a. Such multiple segments also may be secured to or within the support ring 341. Also, the thermally-conductive element 390a may be machined to size, such as to match the outer diameter of the support ring 341. In any case, the thermally-conductive element 390a may be sufficiently coupled to (e.g., brazed, press-fit, mechanically attached, etc.) the support ring 341, in a manner that allows the thermally-conductive element 390a to remain coupled to the support ring 341 during operation of the first radial-bearing assembly 310.

Figure 6B:
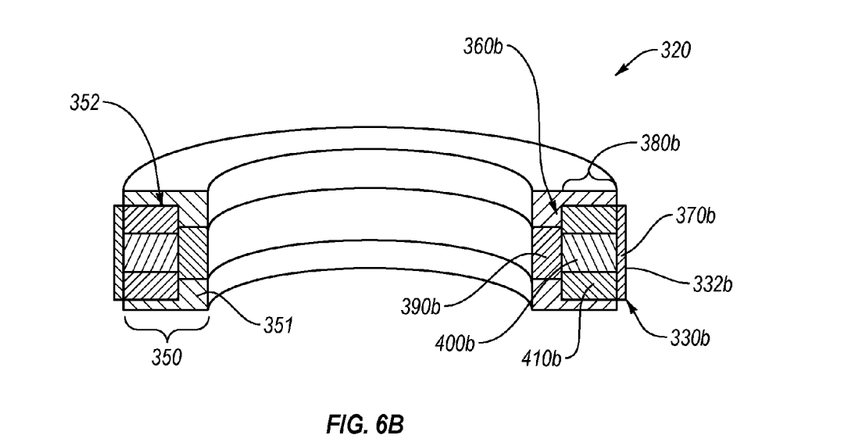
FIG. 6B is an isometric cutaway view of the radial-bearing assembly shown in FIG. 5.

Referring to FIG. 6B, as mentioned above, the first radial-bearing assembly 310 may be positioned within the second radial-bearing assembly 320, such that the concave bearing surfaces 332a of the superhard bearing elements 330a engage the convex bearing surfaces 332b of the superhard bearing elements 330b. Except as otherwise described herein, materials, components and elements (e.g., bearing elements) of the second radial-bearing assembly 320 may be similar to or the same as the materials, components and elements of the first radial-bearing assembly 310 as described above (FIG. 6A). In some embodiments, similar to the first radial-bearing assembly, the second radial-bearing assembly 320 also may include a thermally-conductive structure 360b, which may distribute heat from one or several of the superhard bearing elements 330b among additional superhard bearing elements 330b.

For instance, the thermally-conductive structure 360b may include a thermally-conductive element 390b that may be in thermal communication with the superhard bearing elements 330b. As such, the thermally-conductive element 390b may distribute and/or equalize the thermal load among all or substantially all of the superhard bearing elements 330b. In an embodiment, the thermally-conductive element 390b may be a ring-like element, which may be in thermal communication with an optional post 400b. More specifically, the superhard bearing elements 330b may comprise a superhard table 370b coupled or bonded to a substrate 380b, which may include the optional post 400b.

Additionally, the support ring structure 350 of the second radial-bearing assembly 320 may have a support ring 351, which may provide structural support to the superhard bearing elements 330b. In an embodiment, the support ring 351 may have one or more recesses 352, within which the superhard bearing elements 330b may be secured to the support ring 351. Also, the support ring 351 may hold and/or secure the thermally-conductive element 390b. For example, the support ring 351 may include a slot or a channel that may hold and secure the thermally-conductive element 390b. In some embodiments, the thermally-conductive element 390b may be secured inside an inner channel within the support ring 351. As such, the thermally-conductive element 390b also may at least partially form or define the inside of the opening in the support ring 351, which may, for example, accept a shaft therein.

In at least one embodiment, the thermally-conductive element 390b may be substantially unitary. For instance, the thermally-conductive element 390b may be press-fit into and/or brazed to the channel in the support ring 351. Alternatively, the thermally-conductive element 390b may comprise multiple segments in thermal communication with each other. Optionally, such segments may be welded, brazed, or otherwise connected to one another. Furthermore, the thermally-conductive element 390b may have any number of other suitable sizes and configurations. In any case, as mentioned above, the thermally-conductive element 390b may transfer heat from one or more superhard bearing elements 330b to other superhard bearing elements 330b.

In some embodiments, the superhard bearing elements 330b may include a superhard table 370b and a substrate 380b. The superhard table 370b may be similar to or the same as superhard table 170 and substrate 380b may be similar to or the same as substrate 180 (FIG. 2B), as described above. Optionally, the substrate 380b may include an optional post 400b. For example, the substrate 380b may include a tungsten carbide section 410b and the optional post 400b. The optional post 400b may be press-fitted, brazed or otherwise secured to and/or in the tungsten carbide section 410b, as described above.

Figure 7:
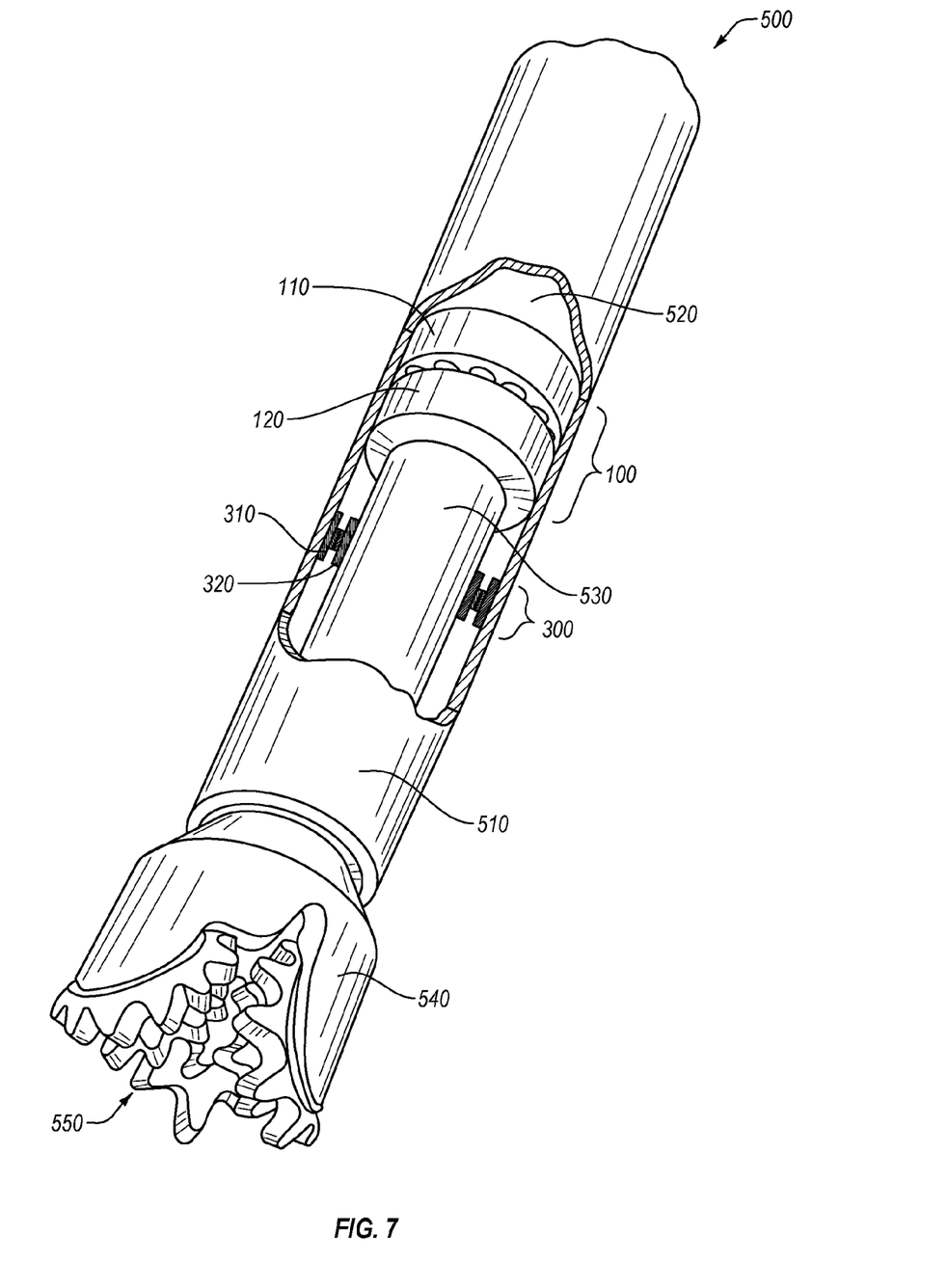
FIG. 7 is an isometric view of a subterranean drilling system in accordance with an embodiment.

As noted above, the thrust-bearing apparatus 100 (FIG. 1) and/or the radial-bearing apparatus 300 (FIG. 5) may be used in any number of mechanisms and mechanical systems. For instance, the thrust-bearing apparatus 100 and/or the radial-bearing apparatus 300 (FIGS. 1, 5) may be used in a subterranean drilling system. An embodiment of a subterranean drilling system is illustrated in FIG. 7. Specifically, one or more embodiments are directed to a subterranean drilling system 500 that has a housing 510 enclosing a downhole drilling motor 520 (e.g., a motor, turbine, or any other device capable of rotating a shaft). The drilling motor 520 may be operably connected to an output shaft 530.

In some embodiments, the subterranean drilling system 500 also may include a thrust-bearing apparatus 100, which also may be operably coupled to the downhole drilling motor 520. The thrust-bearing apparatus 100 may include the first thrust-bearing assembly 110 (a stator) that does not rotate and a second thrust-bearing assembly 120 (a rotor) that is attached to the output shaft 530 and rotates therewith. As mentioned above, the thrust-bearing apparatus 100 may prevent or limit relative axial motion of the output shaft 530, while allowing the output shaft 530 to rotate relative to the housing 510.

In additional or alternative embodiments, the subterranean drilling system 500 may include the radial-bearing apparatus 300. In particular, the radial-bearing apparatus 300 may have the first radial-bearing assembly 310 (a stator) and the second radial-bearing assembly 320 (a rotor). The second radial-bearing assembly 320 may be coupled to the output shaft 530 in a manner that the second radial-bearing assembly 320 may engage the first radial-bearing assembly 310. Moreover, in some embodiments, the first radial-bearing assembly 310 may be coupled to the housing 510 in a manner that substantially prevents the first radial-bearing assembly 310 from moving relative to the housing 510. Hence, the radial-bearing apparatus 300 may prevent or limit relative lateral motion of the output shaft 530 and housing 510, while allowing the output shaft 530 to rotate relative to the housing 510.

Although the illustrated embodiment of the subterranean drilling system 500 provides single thrust-bearing apparatus 100 and a single radial-bearing apparatus 300, it is to be appreciated that the number of the thrust-bearing apparatuses, if any, and/or radial-bearing apparatuses, if any, may vary from one embodiment to another. Accordingly, the subterranean drilling system 500 may include multiple thrust-bearing apparatuses, which may be located along the length of the housing 510 and/or output shaft 530 thereof. Likewise, the subterranean drilling system 500 also may include multiple radial-bearing apparatuses, which may be located along the length of the housing 510 and/or the output shaft 530 thereof. Also, the subterranean drilling system 500 may include only a single thrust-bearing apparatus 100 or a single radial-bearing apparatus 300.

The subterranean drilling system 500 also includes a rotary drill bit 540 configured to engage a subterranean formation and drill a borehole. Particularly, the rotary drill bit 540 may be connected to the output shaft 530 in a manner that the output shaft 530 rotates the rotary drill bit 540. As the rotary drill bit 540 rotates and engages the subterranean formation, the rotary drill bit 540 may drill the borehole therein. In the illustrated embodiment, the rotary drill bit 540 is shown as a "roller cone" type bit, which includes a plurality of roller cones 550. However, other types of rotary drill bits, such as "fixed cutter" drill bits also may be used.

As the borehole is drilled, pipe sections may be connected to the subterranean drilling system 500 to form a drill string capable of progressively drilling the borehole to a greater depth within the earth. Moreover, in some instances, high pressure drilling fluid is circulated through the drill string and power section (not shown) of the downhole drilling motor 520. The high pressure drilling fluid may begin to circulate through the drill string prior to the rotary drill bit 540 engaging the subterranean formations, which may generate torque and rotate the output shaft 530 (and thus the rotary drill bit 540).

Unless rotated from above (e.g., by the drill rig rotary), the housing 510 may remain stationary as the output shaft 530 may rotate together with the rotary drill bit 540. When the rotary drill bit 540 engages the terrain and formations, such as on the bottom of the downhole, a thrust load may be generated. Such thrust load is commonly referred to as "on-bottom thrust," which tends to press or force the output shaft 530 in an axially upward direction relative to the housing 510 and compress the thrust-bearing apparatus 100. In turn, the thrust-bearing apparatus 100 prevents or limits the axial movement of the output shaft 530, as noted above.

Additionally, the flow of the drilling fluid through the drill string and through the power section may create what is commonly referred to as "off-bottom thrust," which tends to press or force the output shaft 530 in an axially downward direction relative to the housing 510. A thrust-bearing apparatus (similar to or the same as the thrust-bearing apparatus 100) may prevent or limit axial downward movement of the output shaft 530 relative to the housing 510 in response to the off-bottom thrust. Thus, a thrust-bearing apparatus also may be compressed by the off-bottom thrust.

The drilling fluid used to generate the rotation of the output shaft 530 and the rotary drill bit 540 may exit openings in the drill string (e.g., in the rotary drill bit 540) and returns to the surface. As such, the drilling fluid may carry cuttings of the subterranean formation through an annular space between the drilled borehole and the subterranean drilling system 500. Furthermore, a portion of the drilling fluid may be diverted by the downhole drilling motor 520 to cool and/or lubricate the thrust-bearing apparatus 100 and/or the radial-bearing apparatus 300.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
    a plurality of superhard bearing elements distributed about an axis, each of the plurality of superhard bearing elements having a substrate and a superhard table bonded thereto, the superhard table forming a superhard bearing surface; and
    a support ring structure including:
        a support ring that supports the plurality of superhard bearing elements; and
        at least one thermally-conductive structure in thermal communication with the support ring and in thermal communication with at least one of the substrates of the plurality of superhard bearing elements, the at least one thermally-conductive structure having a higher thermal conductivity than the support ring.

2. The bearing assembly of claim 1, wherein each of the superhard tables includes polycrystalline diamond.

3. The bearing assembly of claim 2, wherein each of the substrates includes cemented tungsten carbide.

4. The bearing assembly of claim 1, wherein the at least one thermally-conductive structure includes at least one thermally-conductive element secured to the support ring.

5. The bearing assembly of claim 4, wherein each of the substrates includes a post in thermal communication with the at least one thermally-conductive element.

6. The bearing assembly of claim 5, wherein the post is in thermal communication with the superhard table of each of the plurality of superhard bearing elements.

7. The bearing assembly of claim 4, wherein each of the substrates of the plurality of superhard bearing elements is brazed to at least one of the support ring or to the at least one thermally-conductive structure.

8. The bearing assembly of claim 4, wherein the at least one thermally-conductive element is located within an interior channel of the support ring.

9. The bearing assembly of claim 4, wherein the at least one thermally-conductive element at least partially encloses the support ring.

10. The bearing assembly of claim 4, wherein the at least one thermally-conductive element at least partially forms a support surface of the support ring structure.

11. The bearing assembly of claim 1, wherein each of the plurality of the superhard bearing surfaces of the plurality of superhard bearing elements is substantially planar.

12. The bearing assembly of claim 1, wherein each of the plurality of the superhard bearing surfaces of the plurality of superhard bearing elements is convex or concave.

13. The bearing assembly of claim 1, wherein the support ring includes one or more of alloy steel, carbon steel, stainless steel, or tungsten carbide, and wherein the at least one thermally-conductive structure includes one or more of copper, copper alloys, aluminum, aluminum alloys, brass, bronze, gold, silver, graphite, or diamond.

14. The bearing assembly of claim 1, wherein at least a portion of the at least one thermally-conductive structure defines at least a portion of a support surface of the support ring structure.

15. A bearing apparatus, comprising:
    a first bearing assembly including:
        one or more first bearing surfaces; and
        a first support ring carrying the one or more first bearing surfaces; and
    a second bearing assembly including:
        a plurality of superhard bearing elements distributed about an axis, each of the plurality of superhard bearing elements having a superhard table including a second bearing surface, the superhard table bonded to a substrate; and
        a support ring structure including:
            a second support ring that supports the plurality of superhard bearing elements; and
            at least one thermally-conductive structure in thermal communication with the support ring and in thermal communication with at least one of the substrates of the plurality of superhard bearing elements, the at least one thermally-conductive structure having a higher thermal conductivity than the second support ring;
        wherein the at least one thermally-conductive structure includes one or more of copper, copper alloys, aluminum, aluminum alloys, brass, bronze, gold, silver, graphite, or diamond.

16. The bearing apparatus of claim 15, wherein the first bearing assembly includes one or more superhard bearing elements that include the one or more first bearing surfaces.

17. The bearing apparatus of claim 16, wherein the first bearing assembly includes another thermally-conductive structure in thermal communication with the first support ring and in thermal communication with the one or more superhard bearing elements of the first bearing assembly.

18. The bearing apparatus of claim 15, wherein each of the one or more first bearing surfaces and the second superhard bearing surfaces is substantially planar.

19. The bearing apparatus of claim 15, wherein the at least one thermally-conductive structure includes a ring-shaped thermally conductive element in thermal communication with the plurality of superhard bearing elements.

20. A bearing assembly, comprising:
    a plurality of superhard bearing elements distributed about an axis, each of the plurality of superhard bearing elements having a cemented carbide substrate and a polycrystalline diamond table bonded thereto, the polycrystalline diamond table forming a superhard bearing surface; and
    a support ring structure including:

a support ring that supports the plurality of superhard bearing elements; and at least one thermally-conductive structure in thermal communication with the support ring and in thermal communication with at least one of the substrates of the plurality of superhard bearing elements, the at least one thermally-conductive structure having a higher thermal conductivity than the support ring.

\* \* \* \* \*